Nov. 24, 1925.

W. H. POOL 1,562,586

INSECT DESTROYER

Filed March 21, 1925

Inventor
William H Pool
By J M Thomas
Attorney

Patented Nov. 24, 1925.

1,562,586

UNITED STATES PATENT OFFICE.

WILLIAM H. POOL, OF SALT LAKE CITY, UTAH.

INSECT DESTROYER.

Application filed March 21, 1925. Serial No. 17,262.

*To all whom it may concern:*

Be it known that I, WILLIAM H. POOL, a citizen of the United States, residing at Salt Lake City, in the county of Salt Lake and State of Utah, have invented certain new and useful Improvements in Insect Destroyers, of which the following is a specification.

My invention relates to traps or insect destroyers for catching flying insects such as moths and mosquitoes, and has for its object to provide a suitable trap, which has connected therewith a source of illumination for attracting insects at night, and also a bait by which such insects may be attracted during the day or night, and closely associated with the bait and illumination is a receptacle which is to contain a liquid within which the insects are to be caught for future destruction.

Figure 1:
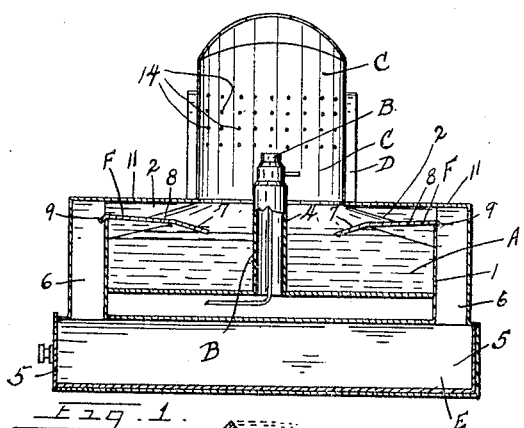
Figure 2:
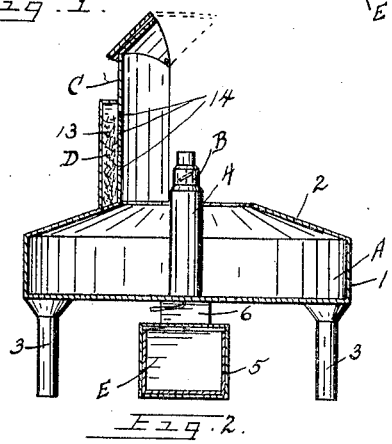
Figure 3:
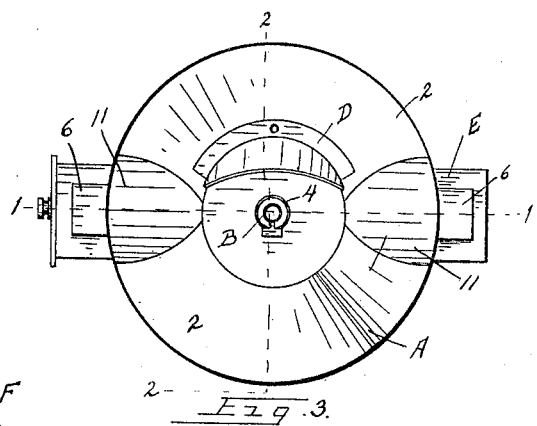
Figure 4:
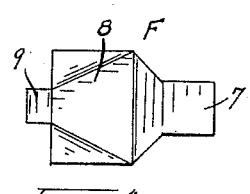

These objects I accomplish with the device illustrated in the accompanying drawings, in which similar letters and numerals of reference indicate like parts throughout the several views, and as described in the specification forming a part of this application and pointed out in the appended claims. In the drawings, in which I have shown a substantial embodiment of my invention, Figure 1 is a vertical transverse section on line 1—1 of Figure 3. Figure 2 is a vertical section through the device on line 2—2 of Figure 3. Figure 3 is a top plan view of the device. Figure 4 is a plan view of the stair and passage way of my device.

The present invention consists of a receptacle for holding the liquid, shown at A. The socket for the illumination is shown at B. The reflector is shown at C; the bait receptacle is at D; the insect holder is at E, and the stair is at F. The liquid receptacle A consists of the annular cup-shaped container 1, having an inwardly turned annular flange 2 and with legs 3. Centrally in said receptacle A is provided the vertical cylinder 4, on the top of which is secured the socket B for the ordinary electric light. As will be obvious other illuminating means such as lamps may be provided and in that instance the vertical cylinder 4 would be given the form of an oil container and the lamp socket B would take the form of a burner. Two diametrically opposed portions of the annular flange 2 are raised as shown at 11, and beneath said parts 11 are placed and secured the stairs F, one on each side. Each stair consists of a horizontal portion 8 with an inclined integral portion radially extended as shown at 7, with two other inclined portions integral with the part 8 and a fourth inclined portion shown at 9. Spaced below said receptacle A is the insect container E preferably shown as a box diametrically placed in reference to said receptacle A and having drawers 5 therein, which may be withdrawn for removing insects caught in said box E. From the opposed ends of said box E are two vertically placed passage ways 6 and said inclined portions 9 of said stairs F are inserted partially within said passage ways 6, in order that insects caught within the fluid carried in said receptacle A may drop from said portion 9 down through either of the passage ways 6 and be caught within said box E. The reflector C is fastened to the inner periphery of said flange 2 and is a semi-cylindrical reflector, preferably made of tin, with a hood portion of similar material on its upper end, the whole forming the reflector against which insects may fly as attracted by the bait or light and fall down into the fluid carried into the receptacle A. On the rear or back of said reflector is provided the bait receptacle D, which is arc shaped and within which is carried cotton waste, pieces of sponge, or other fibrous material on which is placed the liquid insect bait. Perforations 14 are provided in said reflector opening to the bait receptacle D. The said receptacle A is partially filled with the liquid in which the insects are to be caught, partially submerging the portions 7 of the stairs so that insects caught within said liquid and swimming therein may walk or crawl up said stairs and drop off of the portion 9 down and into the drawer 5 of the box E in order that the liquid may not be filled with the insects, and it is the practice to remove the insects from the liquid at least once each day so that at all times flying insects dropping into the liquid will have their wings and extremities covered with the liquid so that thereafter they will not fly. The inclined annular flange 2 will prevent insects from crawling out of said liquid.

The bait used is determined by the particular insect that is desired to be caught. The codling moth bait is the smell of the flower and the fruit of the perfect apple as near as can be found. The bait for the alfalfa weevil is the extract in fluid form from alfalfa. The bait for the cherry aphis is the extract from the perfect cherry, and other baits may be made as near from perfect fruit as can be had. Insects such as gnats and mosquitoes will be attracted by the light and other forms of bait as desired.

Having thus described my invention, I desire to secure by Letters Patent and claim:

1. An insect trap comprising a liquid holding receptacle having an inwardly turned flange, a reflector secured at the inner periphery of said flange, a bait receptacle on the back of said reflector with perforations through the reflector opening to the interior of said bait receptacle, and a source of illumination centrally provided above said receptacle, with a liquid carried in said receptacle, and passage ways from the surface of said liquid to a box under said receptacle.

2. An insect destroyer comprising a liquid container having an inwardly turned annular flange thereon, a perforated reflector on said flange, a bait receptacle adjacent said perforations in said reflector, opposed vertical passage ways opening to the interior of said liquid container below said annular flange and connected with an insect box under said container, an inclined stair terminating in said vertical passage ways, with a source of illumination in front of said reflector and adjacent the liquid which is carried in said container.

In testimony whereof I have affixed my signature.

WILLIAM H. POOL.